US006974536B2

(12) United States Patent
Chaffee

(10) Patent No.: US 6,974,536 B2
(45) Date of Patent: Dec. 13, 2005

(54) WASTEWATER TREATMENT APPARATUS INCLUDING DOSING AND RECIRCULATION CHAMBERS WITHIN A SINGLE TANK

(76) Inventor: Kevin R. Chaffee, 1037 S. Park Acres Dr., Batesville, IN (US) 47006

( * ) Notice: Subject to any disclaimer, the term of this patent is extended or adjusted under 35 U.S.C. 154(b) by 494 days.

(21) Appl. No.: 10/348,497

(22) Filed: Jan. 21, 2003

(65) Prior Publication Data

US 2003/0141229 A1 Jul. 31, 2003

Related U.S. Application Data

(63) Continuation-in-part of application No. 10/019,857, filed as application No. PCT/US00/12615 on May 9, 2000, now Pat. No. 6,616,832, which is a continuation-in-part of application No. 09/309,047, filed on May 10, 1999, now Pat. No. 6,132,599.

(60) Provisional application No. 60/349,262, filed on Jan. 18, 2002.

(51) Int. Cl.⁷ .............................................. C02F 3/04
(52) U.S. Cl. ...................... 210/85; 210/86; 210/104; 210/196; 210/291; 210/170; 210/206; 210/532.2
(58) Field of Search ........................... 210/85, 86, 104, 210/195.1, 196, 197, 170, 206, 532.2, 291

(56) References Cited

U.S. PATENT DOCUMENTS

| | | |
|---|---|---|
| 2,366,917 A | 1/1945 | Levine |
| 3,123,555 A | 3/1964 | Moore |
| 3,126,333 A | 3/1964 | Williams |
| 3,825,119 A | 7/1974 | Rost |
| 3,933,641 A | 1/1976 | Hadden et al. |
| 3,957,642 A | 5/1976 | Oldham et al. |
| 4,100,070 A | 7/1978 | White et al. |
| 4,251,359 A | 2/1981 | Colwell et al. |
| 4,750,999 A | 6/1988 | Roberts et al. |
| 4,812,237 A | 3/1989 | Cawley et al. |
| 4,830,757 A | 5/1989 | Lynch et al. |
| 5,132,599 A | 7/1992 | Kono et al. |
| 5,240,611 A | 8/1993 | Burton |
| 5,277,814 A | 1/1994 | Winter et al. |
| 5,480,561 A | 1/1996 | Ball et al. |
| 5,531,894 A | 7/1996 | Ball et al. |
| 5,554,281 A | 9/1996 | McDougald |
| 5,597,477 A | 1/1997 | Harry, III |
| 5,609,754 A | 3/1997 | Stuth |
| 5,645,725 A | 7/1997 | Zitzelsberger et al. |
| 5,690,827 A | 11/1997 | Simmering et al. |
| 5,707,513 A | 1/1998 | Jowett et al. |

Primary Examiner—Terry K. Cecil
(74) Attorney, Agent, or Firm—Baker & Daniels LLP

(57) ABSTRACT

An apparatus provides for treatment of primary effluent from residential and commercial establishments to allow subsurface or surface disposable of wastewater. A single tank includes dosing and recirculation chambers 28, 30 having no direct fluid communication therebetween and divided by a vertical chamber wall 32. A filter layer 26 is positioned atop both chambers such that wastewater that is filtered therein then flows into both the dosing and recirculation chambers. The position of the wall 32 determines the proportion of filtered wastewater that flows into each chamber by gravity.

25 Claims, 5 Drawing Sheets

WASTEWATER TREATMENT APPARATUS INCLUDING DOSING AND RECIRCULATION CHAMBERS WITHIN A SINGLE TANK

This application claims the benefit of U.S. Provisional Application Ser. No. 60/349,262, filed on Jan. 18, 2002, which is expressly incorporated by reference. In addition, this application is a continuation-in-part of U.S. application Ser. No. 10/019,857, filed Nov. 9, 2001, now U.S. Pat. No. 6,616,832, which claims the benefit of PCT International Application No. PCT/US00/12615, filed May 9, 2000, and which is a continuation-in-part of U.S. application Ser. No. 09/309,047, filed May 10, 1999, now U.S. Pat. No. 6,132,599, all of which are expressly incorporated by reference herein.

BACKGROUND AND SUMMARY OF THE INVENTION

The present invention relates to wastewater treatment systems and improvements thereto. More particularly, this invention relates to an apparatus for treatment of primary effluent from residential and commercial establishments to allow subsurface or surface disposable of wastewater therefrom.

Many areas in this country are experiencing an increase in population accompanied by a larger demand for housing and commercial establishments in rural areas and around major municipalities with no access to a public sewer system. Conventional onsite wastewater systems provide a viable option for managing the wastewater generated by development, however, not all soils are suitable for these systems. Conventional onsite wastewater systems also require a large land area, putting a premium cost on real estate in many locations. In order to maintain a non-hazardous environment, residential and commercial establishments must treat wastewater that they produce. Since public utility wastewater treatment systems and conventional onsite systems are not always available or are not desirable, alternative wastewater treatment methods are often necessary. Due to the premium price on real estate and the high density of residential and commercial building, it is desirable to reduce and minimize the space required for wastewater treatment systems to treat the wastewater to acceptable standards.

According to an illustrated embodiment of the present invention, a wastewater treatment apparatus comprising a recirculation chamber, a dosing chamber having no direct fluid connection to the recirculation chamber, and a filter layer containing a filter media and being located above the recirculation and dosing chambers. The recirculation chamber, the dosing chamber, and the filter layer are located in a single tank. The apparatus also comprises an influent pipe that directs wastewater entering the wastewater treatment apparatus into the recirculation chamber, and a recirculation pump located in the recirculation chamber. The recirculation pump pumps the wastewater from the recirculation chamber onto the filter layer. The apparatus further comprises a septic tank return pipe connected to the dosing chamber, a portion of the wastewater being discharged from the wastewater treatment apparatus through the septic tank return pipe back to a septic tank for additional treatment, and an effluent discharge pipe connected to the dosing chamber. Wastewater is discharged from the wastewater treatment apparatus through the effluent discharge pipe for final disposal.

In the illustrated embodiment, the apparatus further comprising a porous underdrain for the filter layer. Wastewater flowing through the filter media of the filter layer is directed through the underdrain and into the recirculation chamber or the dosing chamber. Illustratively, a chamber wall divides the recirculation chamber and the dosing chamber so that wastewater passing through the underdrain proportionally enters the recirculation chamber and dosing chamber as determined by the placement of the chamber wall.

Also in the illustrated embodiment, the apparatus further comprising a filter distribution pipe and a spray nozzle for the filter layer. The recirculation pump pumps the wastewater onto the filter media of the filter layer through the filter distribution pipe and the spray nozzle.

The illustrated embodiment further includes a treated effluent discharge control system having first and second electric valves on the effluent discharge pipe and the septic tank return pipe, respectively. The first and second electric valves are controlled by the control system selectively to discharge treated effluent to the effluent discharge pipe and the septic tank return pipe.

Additional features of the invention will become apparent to those skilled in the art upon consideration of the following detailed description of the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
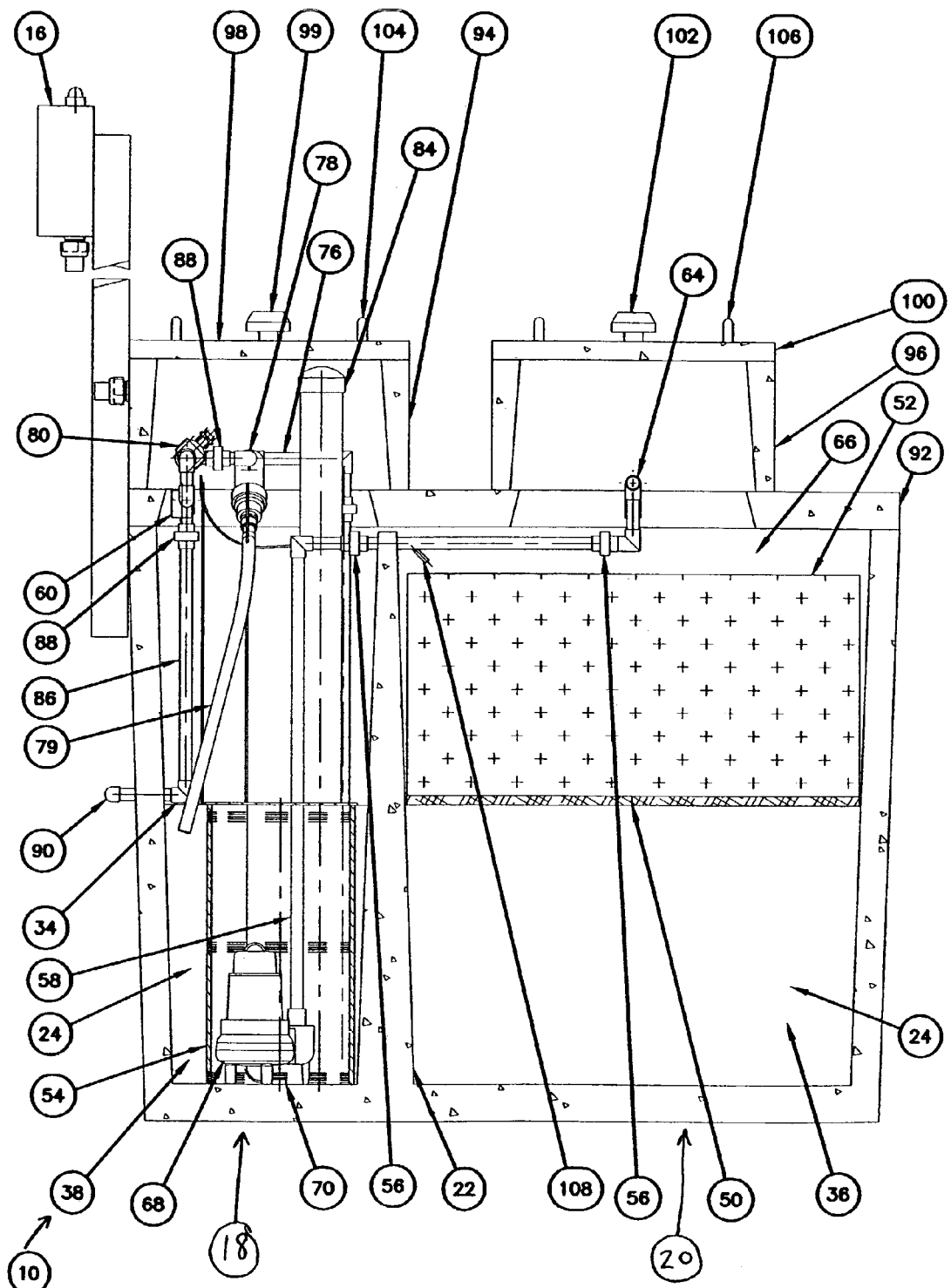
FIG. 1 is a sectional view taken through a waste treatment apparatus of the present invention illustrating that the filter section located above a recirculation chamber and illustrating a recirculation pump located within a recirculation pump basin.

Referring now to the drawings, FIG. 1 illustrates an embodiment of a wastewater treatment apparatus 10 which includes a tank 12. The tank 12 is illustratively made of a suitable material, such as concrete, polyethylene or steel. A tank-lifting notch 14 is provided on the tank 12. The tank 12 is divided into a pump section 18 and a filter section 20 by a pump wall 22 that is substantially the height of the tank 12. The pump section 18 contains at least one pump which circulates the wastewater through the treatment apparatus 10. In the embodiment shown in FIG. 1, filter section 20 includes a single filter layer 26. In other embodiments, multiple filter layers may be used.

Figure 2:
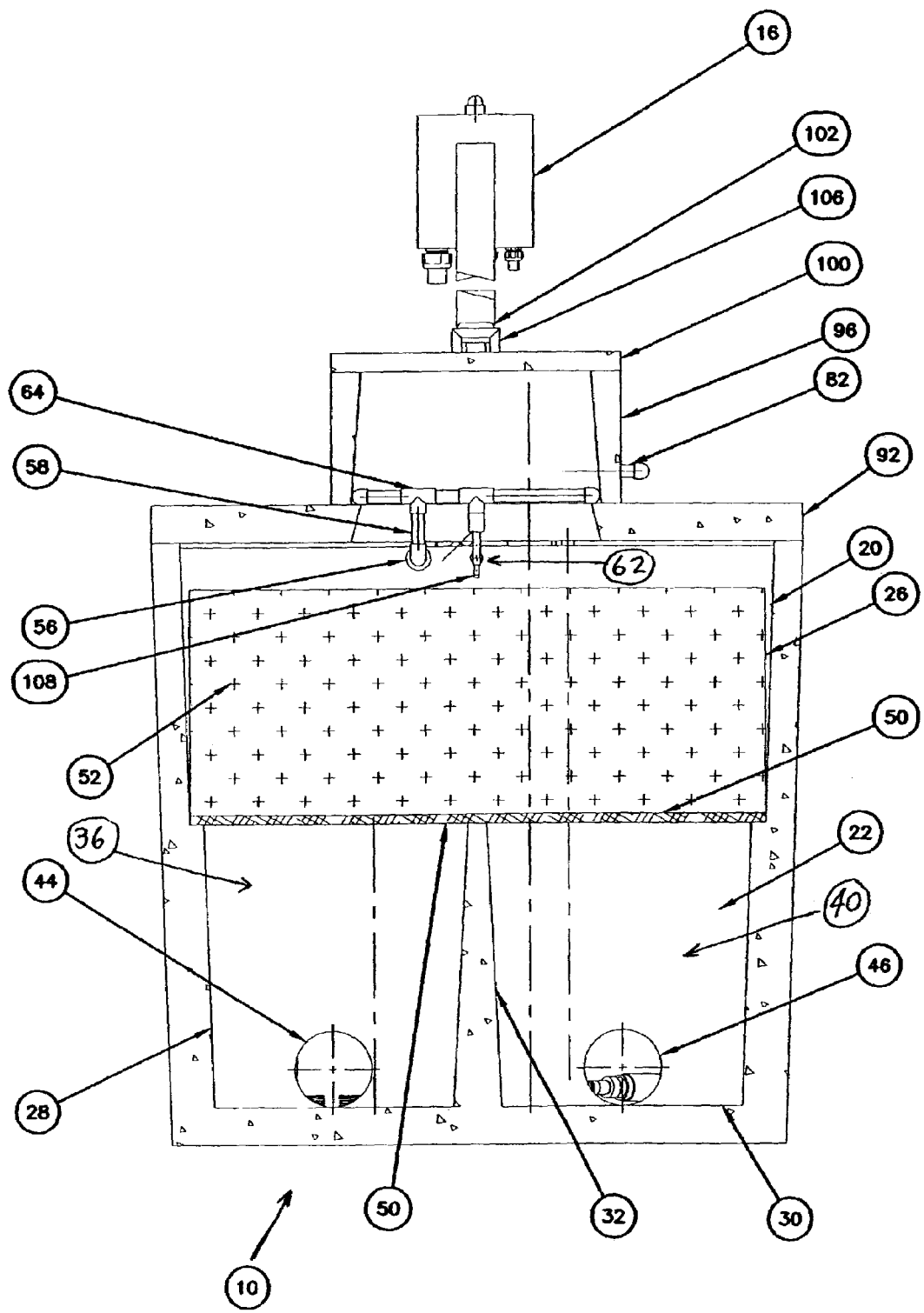
FIG. 2 is a sectional view taken through the apparatus of FIG. 1 illustrating a recirculation basin and a dosing basin below the filter section.

FIG. 2 illustrates a bottom layer 24 of the wastewater treatment apparatus 10 which is divided into a recirculation chamber 28 and a dosing chamber 30 by a chamber wall 32 and a pump chamber wall 34. The chamber wall 32 extends to the bottom of filter layer 26 and the pump chamber wall 34 is substantially the height of the tank 12. The recirculation chamber 28 and the dosing chamber 30 are not in direct fluid communication. The recirculation chamber 28 is divided into a recirculation basin 36 and a recirculation pump basin 38 by the pump wall 22.

Figure 3:
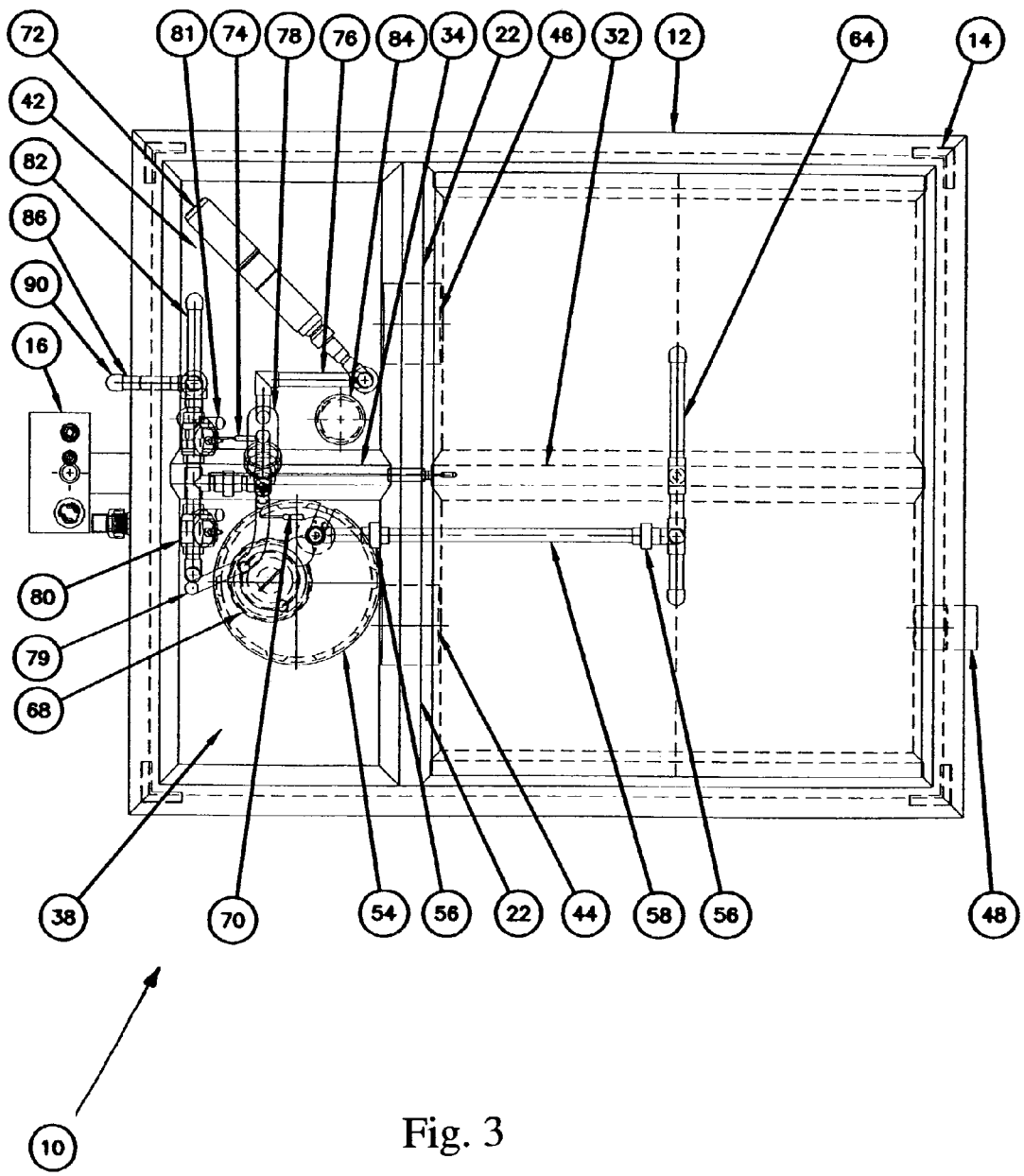
FIG. 3 is a top view of the apparatus with a cover removed illustrating the filter section, a recirculation pump basin, and a dosing pump basin.
Figure 4:
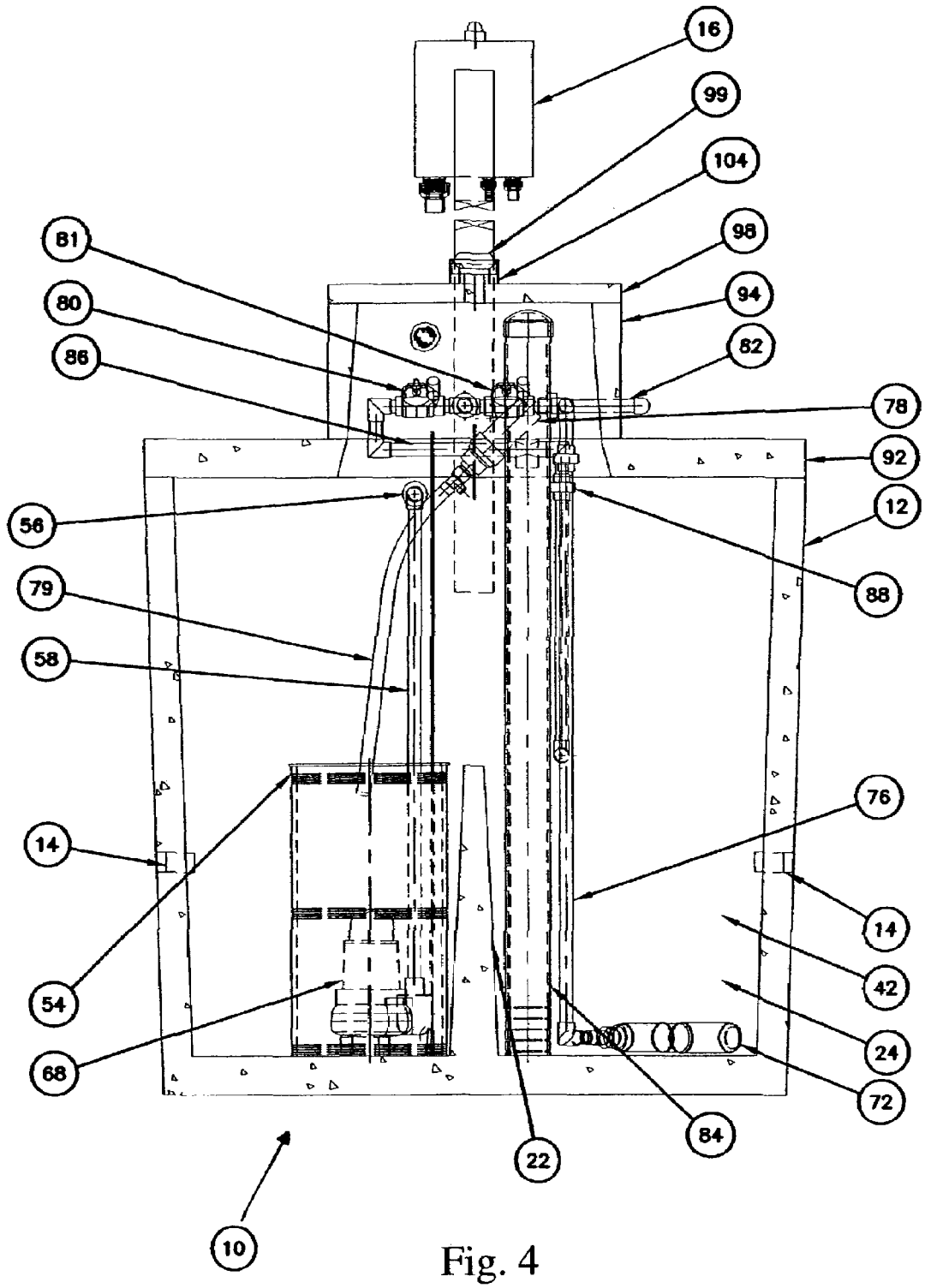
FIG. 4 is a sectional view illustrating further details of a recirculation pump located within the recirculation pump basin and a dosing pump located within the dosing pump basin.
Figure 5:
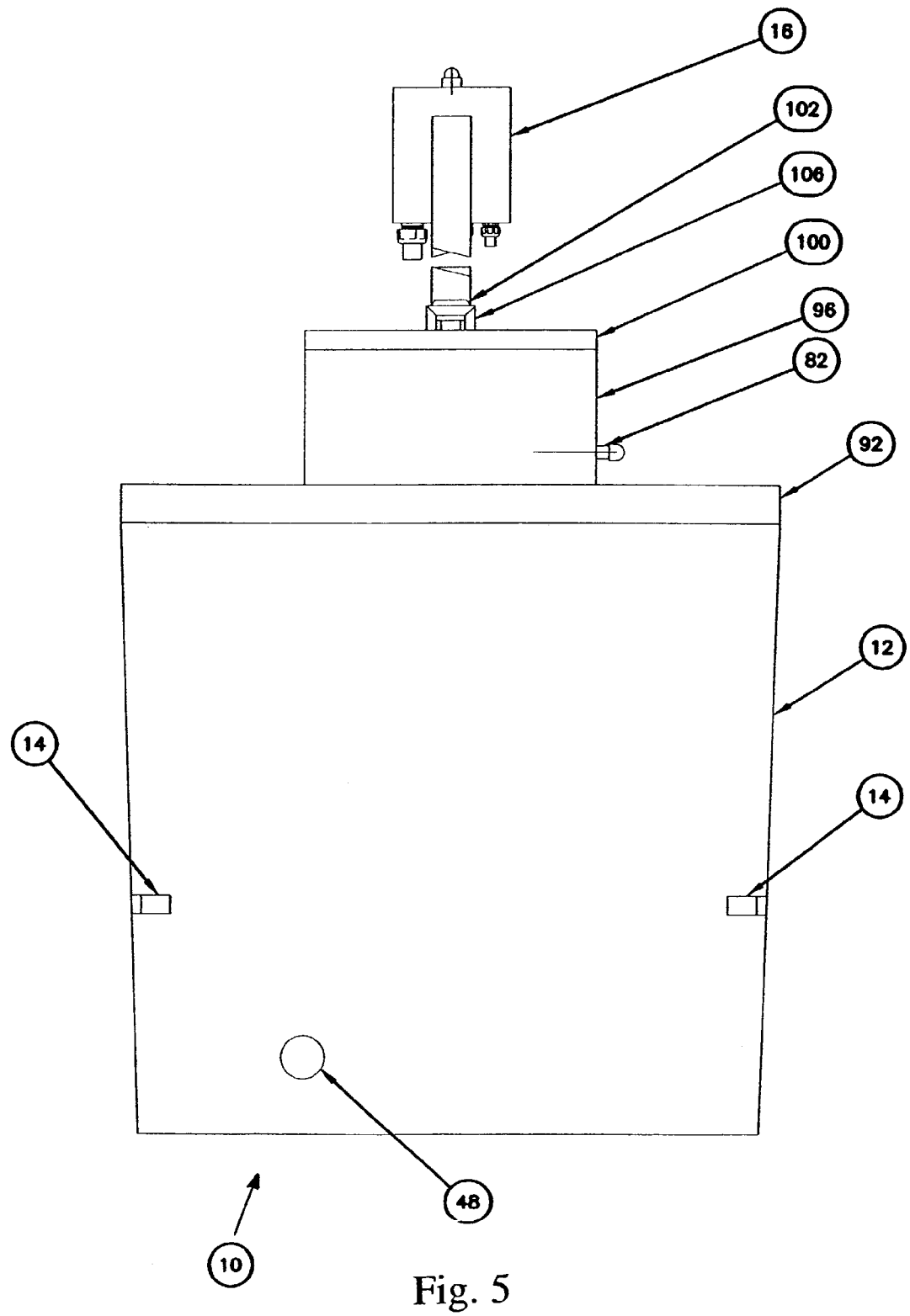
FIG. 5 is an inlet in view of the waste treatment apparatus of the present invention.

Settled and screened wastewater from a septic tank or other primary treatment device enters the apparatus through influent pipe 48 shown in FIG. 5. The influent mixes with treated water falling from filter underdrain 50 and is stored in the recirculation chamber 28. The mixture of influent wastewater and treated effluent flows through the recirculation conduit 44 in the pump wall 22 into the recirculation pump chamber 38 shown in FIG. 3. The recirculation pump 68 pumps the wastewater through a filter distribution pipe 58 to a spray nozzle 62, which sprays and distributes the wastewater over the filter layer 26. Filter distribution pipe 58 includes a plurality of pipe unions 56 which join adjacent pipe segments. A support pipe 64 supports the spray nozzle 62. A slotted plastic pipe or other similar screen 54 surrounds pump 68 preventing the pump from ingesting debris and plugging spray nozzle 62. For larger systems, a larger tank 12 is used with increased filter section 20, single or multiple recirculation pumps 68, single or multiple pump screens 54, multiple spray nozzles 62, and single or multiple dosing pumps 72 based on the flow capacity of the system.

A recirculation basin level control 70, located in the recirculation pump chamber 38 measures the water level in the recirculation chamber 28. A preferred recirculation basin level control is a pressure transducer. A typical pressure transducer is a submersible, stainless steel 4–20 mA output model available from Measurement Specialties, Inc. located in Hampton, Va. When the water level in the recirculation chamber 28 reaches a programmed minimum level above the floor of recirculation chamber 28 as measured by recirculation basin level control 70, control panel 16 activates recirculation pump 68 to begin pumping to filter section 20 on a programmable time interval. The timed doses will repeat on a programmed schedule as long as the water level in the recirculation chamber 28 remains above the programmed minimum level above the floor of recirculation chamber 28.

If the water level in the recirculation chamber 28 rises above a programmed maximum level above the floor of the recirculation chamber 28 as measured by recirculation basin level control 70, control panel 16 activates recirculation pump 68 to pump until a programmed drop in water level in recirculation chamber 28 is achieved. If the water level in recirculation chamber 28 does not drop after a programmed time or the level continues to rise, control panel 16 will signal a high recirculation chamber alarm by activating an alarm light, audio alarm and a telephone dialer within control panel 16 to call and alert a service representative.

The sprayed wastewater is aerated in the air space 66 and flows through the filter layer 26 by gravity. As the wastewater flows through the filter media 52, it is treated by a combination of physical, chemical and aerobic biological processes. A preferred media is textile chips. Illustratively, the filter media 52 is a non-woven textile fabric composed of polyethylene filaments such as Type 4-17PE textile chips available from Texel, Inc. located in Quebec, Canada.

The treated effluent flows through a filter underdrain 50 which illustratively comprises a fiberglass grating, perforated precast concrete or materials of a similar design and falls back into the recirculation basin 36 or the dosing basin 40. The location of chamber wall 32 determines the percentage of effluent entering the recirculation basin 36 or the dosing basin 40 and determines the recirculation ratio for the treatment process. The treated filter effluent in the recirculation basin 36 is mixed with the influent wastewater from pipe 48.

A dosing basin level control 74 located in the dosing pump basin 42 measures the water level in the dosing chamber 30. A preferred dosing basin level control is a pressure transducer. A typical pressure transducer is a submersible, stainless steel 4–20 mA output model available from Measurement Specialties, Inc. located in Hampton, Va. When the water level in the dosing chamber 30 reaches a programmed minimum level above the floor of the dosing chamber 30, the dosing basin level control 74 signals the control panel 16 to begin pumping to the effluent discharge pipe 76 on a programmable timed basis until a programmed level of water has been removed from the dosing chamber 30. The doses will repeat on a programmed schedule as long as the water level in the dosing chamber 30 remains above the programmed minimum level above the floor of the dosing chamber 30. If the water level in the dosing chamber 30 rises above a programmed maximum level above the floor of the dosing chamber 30, the dosing basin level control 74 signals the control panel 16 to start dosing pump 72 and pump until a programmed drop in level is achieved. If the level in the dosing basin does not drop after a programmed time or the level continues to rise, the control panel 16 will signal a high dosing chamber alarm by activating an alarm light, audio alarm and a telephone dialer within control panel 16 to call and alert a service representative.

The treated filter effluent falling into the dosing basin 40 flows through the dosing conduit 46 in the pump wall 22 into the dosing pump basin 42. The dosing pump 72 pumps the treated effluent through the effluent discharge pipe 76 into a treated effluent filter 78, a typical filter being a Spin-Clean filter available from Agricultural Products, Inc. located in Ontario, Calif. The treated effluent filter 78 is equipped with an orifice plate or modulating valve to allow a portion of the treated effluent entering the filter to flush any screenings through the filter flush outlet pipe 79 back to the recirculation pump chamber 38. The treated effluent passing through the treated effluent filter 78 is directed to either the disposal discharge pipe 86 or the septic tank return pipe 82. Treated effluent is returned to the septic tank for denitrification to reduce the nitrates in the aerobically treated effluent. Denitrification occurs in the septic tank due to the lack of oxygen in the tank and the availability of organic carbon in the raw wastewater entering the tank. An electrically actuated disposal discharge pipe valve 80 and an electrically actuated septic tank return pipe valve 81 are installed on the disposal discharge pipe 86 and the septic tank return pipe 82 to direct flow based on control inputs from control panel 16, to either outlet based on the level of treated effluent in the dosing chamber 30 as measured by the dosing basin level control 74.

If water level in the dosing chamber 30 is low, the septic tank return pipe valve 81 on the septic tank return pipe 82 is opened while the disposal discharge pipe valve 80 on the disposal discharge pipe 86 remains closed so that all pumped effluent is returned to the septic tank during the pump dosing cycle. During normal water levels in the dosing chamber 30, the disposal discharge pipe valve 80 and the septic tank return pipe valve 81 are alternatively opened and closed on each pump cycle to evenly distribute the treated effluent to the disposal discharge pipe 86 and the septic return pipe 82. During periods of high water level in the dosing chamber 30, the disposal discharge pipe valve 80 on the disposal discharge pipe 86 is opened while the septic tank return pipe valve 81 on the septic tank return pipe 82 remains closed for the pump cycle so that all effluent is discharged from the treatment system. Alternatively, a single electrically actuated three-way valve could be used in place of disposal discharge pipe valve 80 and septic tank return pipe valve 81. Treated effluent being discharged from the system through disposal discharge pipe 86 passes through a treated effluent flow sensor 60 prior to discharge from the system. A typical treated effluent flow sensor 60 being a RFO/RFA-2500 Series RotorFlow Sensor available from Gems Sensors located in Plainville, Conn. The treated effluent flow sensor 60 sends a signal proportional to the fluid velocity to control panel 16 which converts the signal to a flow rate and totalizes the flow volume over a programmable time period.

An optional tablet chlorinator 84 consisting of a polyvinyl chloride pipe with slots located in the bottom of the pipe below the low water elevation may be located in the dosing pump basin 42. The tablet chlorinator 84 is filled with chlorine disinfectant tablets and capped at the top. The water flowing through the dosing conduit 46 when dosing pump 72 is operating moves through the slotted pipe containing the chlorine tablets and slowly dissolves the tablets while imparting a chlorine residual in the treated effluent. The chlorine residual acts to disinfect the treated effluent by killing the pathogenic organisms in the effluent. The hardness and percentage of chlorine in the tablets can be regulated to produce the proper chlorine residual in the treated effluent to provide the necessary disinfection level. Alternately, other forms of treated effluent disinfection can be used such as ultraviolet light disinfection or ozonation.

Pump section riser 94 located over the pump section 18 provides access to the pumps and mechanical equipment for maintenance. The pump section riser 94 is covered with pump section hatch 98 and is removed using pump section hatch handles 104. The pump section hatch 98 includes pump section vent 99 which allows air to enter pump section 18 to replace the water removed during the pumping cycles. The filter section riser 96 is located over the filter section 20 and provides access to the spray nozzle support pipe 64, spray nozzle 62, air space 66, and filter media 52 for maintenance. The filter section riser 96 is covered with filter section hatch 100 and is removed using filter section hatch handles 106. Filter section hatch 98 includes filter section vent 102 which allows air to enter and mix with the sprayed wastewater in air space 66. As the wastewater falls by gravity through filter layer 26, air is pulled in through filter section vent 102 to displace the water, thereby passively aerating the filter media 52. A filter level switch 108 is installed within the air space 66 to provide a signal to control panel 16 if the filter media 52 should become plugged and water begins ponding on top of the filter layer 26.

Although the invention has been described in detail with reference to certain illustrated embodiments, variations and modifications exist within the scope and spirit of the present invention as described and defined in the following claims.

What is claimed is:

1. A wastewater treatment apparatus comprising:
    a recirculation chamber;
    a dosing chamber having no direct fluid connection to the recirculation chamber, and separated therefrom by a substantially vertical chamber wall;
    a filter layer containing a filter media and being located atop the recirculation and dosing chambers and the substantially vertical chamber wall, the recirculation chamber, the dosing chamber, and the filter layer being located in a single tank;
    an influent pipe that directs wastewater entering the wastewater treatment apparatus into the recirculation chamber;
    a recirculation pump located in the recirculation chamber, the recirculation pump pumping the wastewater from the recirculation chamber onto the filter layer;
    a porous filter underdrain, the wastewater treatment apparatus being configured such that the wastewater flowing through the filter media of the filter layer is directed through the underdrain and is then directed simultaneously into the recirculation chamber and the dosing chamber by gravity;
    a septic tank return pipe connected to the dosing chamber, a portion of the wastewater being discharged from the wastewater treatment apparatus through the septic tank return pipe back to a septic tank for additional treatment; and
    an effluent discharge pipe connected to the dosing chamber, the wastewater being discharged from the wastewater treatment apparatus through the effluent discharge pipe for final disposal.

2. The wastewater treatment apparatus of claim 1, wherein the chamber wall divides the recirculation chamber and the dosing chamber so that wastewater passing through the underdrain proportionally enters the recirculation chamber and dosing chamber as determined by the placement of the chamber wall.

3. The wastewater treatment apparatus of claim 1, further comprising a filter distribution pipe and a spray nozzle for the filter layer, the recirculation pump pumping the wastewater onto the filter media of the filter layer through the filter distribution pipe and the spray nozzle.

4. The wastewater treatment apparatus of claim 3, further comprising a screen surrounding the recirculation pump, the screen being configured to prevent the recirculation pump from ingesting debris or solids which would cause the spray nozzle to plug.

5. The wastewater treatment apparatus of claim 3, further comprising a filter section vent having an outside vent opening open to the atmosphere, and an opening at the filter layer creating an air space above the filter media of the filter layer, wherein the wastewater pumped through the filter distribution piping and spray nozzle assembly of the filter layer is sprayed into the air space of the filter layer.

6. The wastewater treatment apparatus of claim 3, further comprising a filter section riser, a filter section hatch and a filter section hatch handle located over the filter layer to allow access to the filter distribution pipe, the spray nozzle, a spray nozzle support pipe, and the filter media for maintenance and replacement.

7. The wastewater treatment apparatus of claim 1, further comprising a dosing pump located in the dosing chamber, the dosing pump pumping the wastewater from the dosing chamber through the effluent discharge pipe.

8. The wastewater treatment apparatus of claim 7, further comprising a dosing basin level control, the dosing basin level control activating the dosing pump when the level of wastewater in the dosing chamber reaches a predetermined dosing pump activation level.

9. The wastewater treatment apparatus of claim 8, further comprising a dosing pump timer, the dosing pump timer periodically activating the dosing pump, the dosing basin level control disabling activation of the dosing pump when the level of wastewater in the dosing chamber is below a predetermined dosing chamber minimum level, and enabling activation of the dosing pump when the level of wastewater in the dosing chamber is above a predetermined operating level.

10. The wastewater treatment apparatus of claim 7, further comprising a control system having an alarm, the control system monitoring an amperage draw by the recirculation pump and the dosing pump, the control system being preset with an acceptable range for the amperage draw, the control system triggering the alarm when the amperage draw goes outside of the acceptable range for the amperage draw.

11. The wastewater treatment apparatus of claim 1, further comprising an effluent filter on the effluent discharge pipe, the effluent filter preventing solids from being discharged from the treatment apparatus, the effluent filter including a valve to allow the discharge flow through the filter to flush solids and debris from the filter through a filter flush outlet pipe back to the recirculation chamber.

12. The wastewater treatment apparatus of claim 1, further comprising a treated effluent discharge control system having first and second electric valves on the effluent discharge pipe and the septic tank return pipe, respectively, the first and second electric valves being controlled by the control system selectively to discharge treated effluent to the effluent disposal system and return the treated effluent back to the septic tank to dilute incoming wastewater and for further treatment, the control system opening and closing the first and second valves based on predetermined depths of wastewater in the dosing chamber as measured by the dosing basin level control.

13. The wastewater treatment apparatus of claim 1, further comprising a treated effluent flow sensor on the effluent discharge pipe, the flow sensor measuring the velocity of the effluent in the effluent discharge pipe, and a control system converting the velocity into a daily flow amount and storing the flow information.

14. The wastewater treatment apparatus of claim 1, further comprising a recirculation pump timer, the recirculation pump timer periodically activating the recirculation pump.

15. The wastewater treatment apparatus of claim 1, further comprising a recirculation basin level control, the recirculation basin level control activating the recirculation pump when the level of wastewater in the recirculation chamber reaches a predetermined recirculation chamber maximum level.

16. The wastewater treatment apparatus of claim 1, wherein the recirculation chamber includes a recirculation basin and a recirculation pump chamber, the recirculation basin and the recirculation pump chamber being connected by a recirculation conduit.

17. The wastewater treatment apparatus of claim 1, wherein the dosing chamber includes a dosing basin and a dosing pump chamber, the dosing basin and the dosing pump chamber being connected by a dosing conduit.

18. The wastewater treatment apparatus of claim 1, further comprising a control system having an alarm, the control system monitoring ponding of water on the filter media of the filter layer, the control system triggering the alarm when ponding of water is detected on the filter media of the filter layer.

19. The wastewater treatment apparatus of claim 1, further comprising a control system including a modem card, the modem card being activated by at least one of a recirculation chamber level alarm and a dosing chamber level alarm, the modem card, when activated, initiating a call to a preset phone number to notify a responsible person of at least one of the recirculation chamber level alarm and the dosing chamber level alarm.

20. The wastewater treatment apparatus of claim 1, further comprising a tablet chlorinator installed in the dosing chamber, the tablet chlorinator providing chemical chlorine to the treated effluent for disinfection.

21. A wastewater treatment apparatus comprising:
a recirculation chamber;
a dosing chamber having no direct fluid connection to the recirculation chamber, and separated therefrom by a substantially vertical chamber wall;
a filter layer containing a filter media and being located atop the recirculation and dosing chambers and the substantially vertical chamber wall, the dosing chamber, and the filter layer being located in a single tank;
an influent pipe that directs wastewater entering the wastewater treatment apparatus into the recirculation chamber;
a recirculation pump located in the recirculation chamber, the recirculation pump pumping the wastewater from the recirculation chamber onto the filter layer, the wastewater treatment apparatus being configured such that the wastewater flowing through the filter media of the filter layer thereafter simultaneously flows into the recirculation and dosing chambers by gravity;
a septic tank return pipe connected to the dosing chamber, a portion of the wastewater being discharged from the wastewater treatment apparatus though the septic tank return pipe back to a septic tank for additional treatment; and
an effluent discharge pipe connected to the dosing chamber, the wastewater being discharged from the wastewater treatment apparatus through the effluent discharge pipe for final disposal.

22. The wastewater treatment apparatus of claim 21, further comprising a porous underdrain for the filter layer, the wastewater flowing through the filter media of the filter layer being directed through the underdrain and into the recirculation chamber or the dosing chamber.

23. The wastewater treatment apparatus of claim 22, wherein the chamber wall divides the recirculation chamber and the dosing chamber so that wastewater passing through the underdrain proportionally enters the recirculation chamber and dosing chamber as determined by the placement of the chamber wall.

24. The wastewater treatment apparatus of claim 21, further comprising a filter distribution pipe and a spray nozzle for the filter layer, the recirculation pump pumping the wastewater onto the filter media of the filter layer through the filter distribution pipe and the spray nozzle.

25. The wastewater treatment apparatus of claim 21, further comprising a treated effluent discharge control system having first and second electric valves on the effluent discharge pipe and the septic tank return pipe, respectively, the first and second electric valves being controlled by the control system selectively to discharge treated effluent to the effluent discharge pipe and the septic tank return pipe.

* * * * *